US 6,766,333 B1

United States Patent
Wu et al.

(10) Patent No.: US 6,766,333 B1
(45) Date of Patent: Jul. 20, 2004

(54) METHOD AND APPARATUS FOR SYNCHRONIZING A USER INTERFACE ELEMENT DISPLAYED ON A CLIENT AND A SOFTWARE APPLICATION COMPONENT EXECUTING ON A WEB SERVER

(75) Inventors: Zhixue Wu, Cambridge (GB); David Halls, Cambridge (GB); Rob van der Linden, Cottenham (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 345 days.

(21) Appl. No.: 09/708,327

(22) Filed: Nov. 8, 2000

(51) Int. Cl.[7] .............................................. G06F 17/30
(52) U.S. Cl. ........................................ 707/201; 707/10
(58) Field of Search .......................... 707/101, 103 R, 707/104.1, 201, 500.1; 700/97; 709/203, 225, 226, 231; 717/107, 108

(56) References Cited

U.S. PATENT DOCUMENTS

| | | | |
|---|---|---|---|
| 5,530,852 A | 6/1996 | Meske, Jr. et al. | 709/206 |
| 5,537,546 A | 7/1996 | Sauter | 709/230 |
| 5,572,643 A | 11/1996 | Judson | 709/218 |
| 5,623,656 A | 4/1997 | Lyons | 707/10 |
| 5,657,390 A | 8/1997 | Elgamal et al. | 713/151 |
| 5,701,451 A | 12/1997 | Rogers et al. | 707/1 |
| 5,710,918 A | 1/1998 | Lagarde et al. | 707/10 |
| 5,737,529 A | 4/1998 | Dolin, Jr. et al. | 709/245 |
| 5,737,592 A | 4/1998 | Nguyen et al. | 707/4 |
| 5,737,622 A | 4/1998 | Rogers et al. | 713/324 |
| 5,754,830 A | 5/1998 | Butts et al. | 709/311 |
| 5,838,906 A | 11/1998 | Doyle et al. | 709/202 |
| 5,838,910 A | 11/1998 | Domenikos et al. | 709/203 |
| 5,838,916 A | 11/1998 | Domenikos et al. | 709/219 |
| 5,973,696 A | 10/1999 | Agranat et al. | 345/760 |
| 6,292,933 B1 * | 9/2001 | Bahrs et al. | 717/107 |

| | | | |
|---|---|---|---|
| 2002/0059327 A1 | 5/2002 | Starkey | |

FOREIGN PATENT DOCUMENTS

| | | | |
|---|---|---|---|
| AU | A-53031/98 | 8/1998 | G06F/17/30 |
| EP | 0 483 576 A2 | 5/1992 | G06F/15/40 |
| GB | 2359157 A * | 8/2001 | 102/332 |
| WO | WO 98/47068 | 10/1998 | |

OTHER PUBLICATIONS

XP 000567404 "Using JavaScript to Create Interactive Web Pages," A cross–platform object scripting language, Tom Tessier, Dr. Dobb's Journal, Mar. 1996, pp. 84–97.
XP 000567281 "Wired on the Web," Andrew Singleton.
XP 000617303 "An Interactive Hypermedia Map Viewer," by Philip Davis, The Xerox PARC Map Server, 1995 Apr./May DATABASE, pp. 65–67.
XP 000567305 "Creating a hypertext markup language document for an information server," Josey Y. M. Chu, William L. Palya, and Donald E. Walter, Jacksonville State University, Jacksonville, Alabama, Copyright 1995 Psychonomic Society, Inc., pp. 200–205.

(List continued on next page.)

Primary Examiner—Diane D. Mizrahi
Assistant Examiner—Apu Mofiz
(74) Attorney, Agent, or Firm—John D. Lanza, Esq.; Lahive & Cockfield LLP (57) ABSTRACT

A system and method for synchronizing a user interface element displayed on a client and a software application component executing on a web server are described. The synchronizing of a user interface element and a software application component includes representing a user interface element as a user interface element component having a characteristic and providing a wiring descriptor relating the characteristic of the user interface element component with a characteristic of a software application component. The wiring descriptor associates the user interface element component with the software application component and synchronizes the characteristic of the user interface element component with the characteristic of the software application component.

32 Claims, 9 Drawing Sheets

OTHER PUBLICATIONS

"Dynamic Host Configuration Protocol," R. Droms, Bucknell University, Oct. 1993, pp. 1–39.

XP 000570180 "Java and Internet Programming," Similar to C and C++, but much simpler, by Arthur van Hoff.

XP 000579909 Computer Networks and ISDN Systems, "Interactive information services using World–Wide Web hypertext," by Steve Putz, Xerox Palo Alto Research Center, 3333 Coyote Hill Road, Palo Alto, CA 94304, USA, pp. 273–280.

The Animator Applet (1.0.2)—example 1, printed Jun. 1, 1999 4:25 PM (2 pages).

Microsoft Systems Journal, "Leveraging Your Visual C++, Experience on the Internet with Thin Client Technology," by David C. Mitchell, http://www.microsoft.com/MSJ/1296/thinClient/thinClient.htm, printed Jul. 26, 1999, (16 pages).

International Searching Authority, "International Search Report," PCT Application No. PCT/US01/50197, mailed on Nov. 26, 2003, 3 pgs.

* cited by examiner

METHOD AND APPARATUS FOR SYNCHRONIZING A USER INTERFACE ELEMENT DISPLAYED ON A CLIENT AND A SOFTWARE APPLICATION COMPONENT EXECUTING ON A WEB SERVER

FIELD OF THE INVENTION

The present invention relates generally to synchronizing software components and, in particular, to synchronizing a user interface element displayed on a client and a software application component executing on a web server.

BACKGROUND OF THE INVENTION

A servlet, which is a Java applet that runs on a web server, often improves portability of software. Because a servlet is a Java program, a servlet does not have to be recompiled for different operating systems. Web developers of highly interactive Hyper Text Markup Language (HTML) applications often utilize servlets for server-side web development. Dynamic web pages based on servlets can be transmitted between servers easily and can typically be integrated well with "back-end" applications (i.e., the part of an application executing on a server while another part of the application executes on a client computer).

When programming with servlets, application developers often use Java Beans to access databases or applications. The servlet could write HTML tags, text, and data to an output stream to present the results of the function completed by the Java Bean to the user viewing the web page. More specifically, programmers usually invoke a print statement, such as the Java method "println( )", for each HTML line to present the results to the user. Because an application developer includes the HTML content of the web page within the software code, the application developer faces an arduous and time-consuming task for long HTML web pages. Additionally, the application developers generally have to make all content changes that the HTML content creators (i.e., HTML developers) want completed.

Java Server Pages (JSP) improve the separation between HTML developers and application developers. JSP enables an application developer to include pieces of Java code within the HTML web page, and the web server would automatically create a servlet from the web page. Therefore, application developers could include the HTML code without invoking a print statement, and HTML developers could make changes to the HTML. However, having HTML developers and application developers working on the same file can become unproductive and impractical for separate development. For example, while one application developer modifies a file, most other developers generally cannot concurrently modify the file and consequently have to wait until the application developer finishes the modifications. Furthermore, having two languages in one file (i.e., including Java code inside HTML) can create a file that is difficult to read.

Thus, there remains a need to enable a clear separation between the files developed by an HTML developer and an application developer.

SUMMARY OF THE INVENTION

The present invention relates to a method and apparatus for synchronizing a user interface element displayed on a client and a software application component executing on a web server. In one aspect, the invention relates to a method for synchronizing a user interface element and a software application component. The method includes the steps of representing a user interface element as a user interface element component having a characteristic and providing a wiring descriptor relating the characteristic of the user interface element component with a characteristic of a software application component. The method also includes the steps of executing the wiring descriptor to associate the user interface element component with the software application component and synchronizing the characteristic of the user interface element component with the characteristic of the software application component.

In one embodiment, the step of providing a wiring descriptor to relate the characteristic of the user interface element component with a characteristic of the software application component further includes identifying a fragment of a web page. In yet another embodiment, the step of providing a wiring descriptor further includes identifying an event to synchronize the characteristic of the user interface element component and the characteristic of the software application component.

In another aspect, the invention relates to an apparatus for synchronizing a user interface element displayed on a client and a software application component executing on a web server. The apparatus includes a user interface property module, a logic property module, and an event module. The user interface property module identifies a characteristic of a user interface element component. The logic property module identifies a characteristic of a software application component. The event module identifies an event to synchronize the characteristic of the user interface element object and the characteristic of the software application object when the event occurs.

In one embodiment, the apparatus also includes a database server that stores and manages data. In another embodiment, the apparatus includes a middleware server to consolidate requests and responses between the web server and the database server. In yet another embodiment, the apparatus includes a software design station that provides the user interface element. In another embodiment, the apparatus includes an application development system that provides the software application component. In another embodiment, the apparatus includes a connection module that specifies a dynamic user interface.

BRIEF DESCRIPTION OF THE DRAWINGS

The advantages of the invention described above, together with further advantages, may be better understood by referring to the following description taken in conjunction with the accompanying drawings. In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
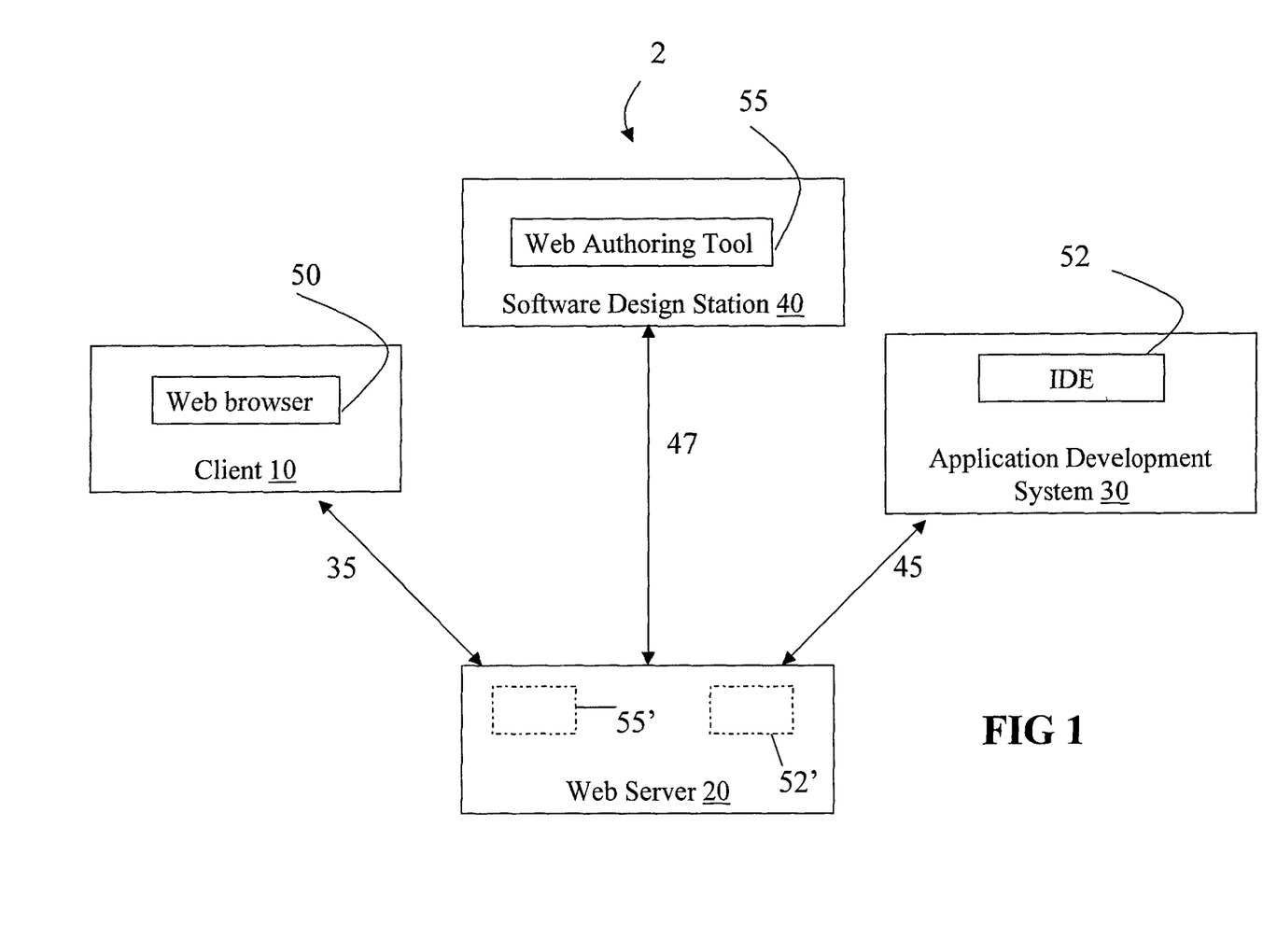
FIG. 1 is a block diagram of an embodiment of a computer network constructed in accordance with the invention.

Referring to FIG. 1, one embodiment of a computer network 2 constructed in accordance with the invention is depicted, which includes a client computer 10, or client, a web server 20, an application development system 30, and a software design station 40. In brief overview, the web server 20 is in communication with the client 10 over a web communication channel 35, and in communication with the application development system 30 over an application communication channel 45. The web server 20 is also in communication with the software design station 40 over a software component communication channel 47. Additional components of the computer network 2 are omitted and will be described further in FIG. 2.

The web communication channel 35, the application communication channel 45, and the software component communication channel 47 can support communications over a local-area network (LAN), a medium-area network (MAN), or a wide area network (WAN) such as the Internet or the World Wide Web. Example embodiments of these communication channels 35, 45, 47 include standard telephone lines, LAN or WAN links (e.g., T1, T3, 56 kb, X.25), broadband connections (ISDN, Frame Relay, ATM), and wireless connections. The connections over these communication channels 35, 45, 47 can be established using a variety of communication protocols (e.g., TCP/IP, IPX, SPX, NetBIOS, Ethernet, RS232, and direct asynchronous connections). In some embodiments, the protocols used may be the Independent Computing Architecture (ICA) protocol, developed by Citrix Systems, Inc. of Fort Lauderdale, Fla., the Remote Display Protocol (RDP), developed by Microsoft Corporation of Redmond, Wash., X-Windows, developed by Massachusetts Institute of Technology of Cambridge, Mass., and the like.

The client 10 can be any personal computer (e.g., 286, 386, 486, Pentium, Pentium II, Macintosh computer), Windows-based terminal, Network Computer, wireless device, information appliance, RISC Power PC, X-device, workstation, mini computer, main frame computer, personal digital assistant, or other computing device that has a windows-based desktop and sufficient persistent storage for executing a small, display presentation program. The display presentation program uses commands and data sent to it by the web server 20 across the web communication channel 35 to render a graphical display. Windows-oriented platforms supported by the client 10 can include, without limitation, WINDOWS 3.x, WINDOWS 95, WINDOWS 98, WINDOWS NT 3.51, WINDOWS NT 4.0, WINDOWS 2000, WINDOWS CE, MAC/OS, Java, and UNIX. The client 10 can include a visual display device (e.g., a computer monitor), a data entry device (e.g., a keyboard), persistent or volatile storage (e.g., computer memory) for storing downloaded application programs, a processor, and a mouse. Execution of a small, display presentation program allows the client 10 to participate in a distributed computer system model (i.e., a server-based computing model).

In a distributed computer system model, the execution of application programs occurs entirely on the web server 20 and the user interface (UI), keystrokes, and mouse movements are transmitted over the web communication channel 35 to the client 10. The user interface can be text driven (e.g., DOS) or graphically driven (e.g., Windows). Platforms that can be supported by the client 10 include DOS and Windows CE for windows-based terminals. Alternatively, the client can operate according to a "thin-client" model.

The web server 20 can be any computing device that delivers data, such as the contents of a web page, to the client 10 over the web communication channel 35. Similar to the client, the web server 20 can include a visual display device (e.g., a computer monitor), a data entry device (e.g., a keyboard), persistent or volatile storage (e.g., computer memory) for storing downloaded application programs, a processor, and a mouse. In another embodiment, the web server 20 is a member of a server farm (not shown). A server farm is a logical group of one or more servers that are administered as a single entity.

In one embodiment shown in FIG. 1, the client 10 includes a web browser 50, such as Internet Explorer™ developed by Microsoft Corporation in Redmond, Wash., to connect to the web. Under the control of the web browser 50, the client 10 sends a web page request over the web communication channel 35 to the web server 20. Web page data can be in the form of text, graphics, and other forms of information. If the client 10 can access any one of multiple web servers 20 over the web communication channel 35, the user must supply a known address (a URL) to the web browser 50 in order to connect to the appropriate web server 20. Because web servers 20 can contain more than one web page, the user also specifies in the address which particular web page he or she wants to view on the web browser 50. The web page request also includes, in one embodiment, a request to execute an application program on the web server 20. The web server 20 receives this request and, in a distributed computer system model, executes the desired application program.

As described above for the client 10 and the web server 20, the application development system 30 and the software design station 40 can be any device (e.g., Windows-based terminal, personal computer) with persistent or volatile storage (e.g., computer memory), a processor, a visual display device (e.g., computer monitor), and a data entry device (e.g., a keyboard). In one embodiment depicted in FIG. 1, the application development system 30 includes an Integrated Development Environment (IDE) 52. The IDE 52 is a programming environment integrated into an application. For instance, Microsoft Office applications support various versions of the BASIC programming language. Example embodiments of an IDE include, without limitation, Simplicity for Java, manufactured by Data Representations of Springfield, N.J. and Visual Café, developed by Symantec of Cupertino, Calif. In another embodiment also shown in FIG. 1, application developers develop application components on the web server 20 with an IDE 52'.

Application developers develop application components, such as JavaBean components (i.e. Beans), with the IDE 52. Software components (e.g., Java Beans) are reusable, interchangeable, and separate parts of a software application. Although application components can be developed with and written in other programming languages (e.g., Visual Basic, C++), the application components, as further described below, are Java Beans written in the Java programming language.

The interface to a Java Bean component consists of a specific set of methods, properties, and events. "Methods" are associated with a software class and are the procedures performed by the Java Bean. "Properties" define the characteristic of the Java Bean. As used in this specification, the term "event" is broad enough to encompass any action or occurrence that a program detects. For example, events can be user actions, such as clicking a mouse button or pressing a key, or system occurrences, such as running out of memory. The software design station 40 and the application development system 30 determine the capabilities (e.g., what kinds of events the Bean can generate or respond to) of the application components through this interface. After the completion of the application components, the application developers transmit the application components to the web server 20 for subsequent use.

Software developers, also referred to as Hyper Text Markup Language (HTML) developers throughout this specification, develop software (e.g., HTML) components using the software design station 40. HTML components are client-side components (i.e., execute on the client 10). Examples of HTML components include, but are not limited to, scroll bars, buttons, menu bars, tables, calendars, calculators, and the like. After an HTML developer completes an HTML component, the HTML developer transmits the component to the web server 20 for subsequent use. Although the software components are described throughout this specification as HTML components, one skilled in the art will realize that software developers can use other programming languages (e.g., Java, C++, Visual Basic) to develop software components that are either client-side components (i.e., execute on the client 10) or server-side components (i.e., execute on the web server 20). When different programming languages are used by software developers, however, the web server 20 checks that the web browser 50 supports the programming language used to develop the software components before the web server 20 transmits the web page (or application) to the client 10.

The software design station 40 executes a web page authoring tool 55 (i.e., HTML editor). In one embodiment, and as described throughout this specification, software developers use the web page authoring tool 55 to develop and modify web pages written in HTML. In other embodiments, software developers use other programming languages, such as, but not limited to, the Extensible Markup Language, or XML, to develop web pages. Examples of web page authoring tools 55 include, without limitation, Dreamweaver manufactured by Macromedia, Incorporated of San Francisco, Calif., WebEditor manufactured by Namo Interactive Inc. of Seoul, Korea, GoLive manufactured by Adobe Systems Incorporated of San Jose, Calif., and FrontPage developed by Microsoft Corporation of Redmond, Wash. Alternatively, the web server 20 executes a web page authoring 55' for use by the HTML developers.

Figure 2:
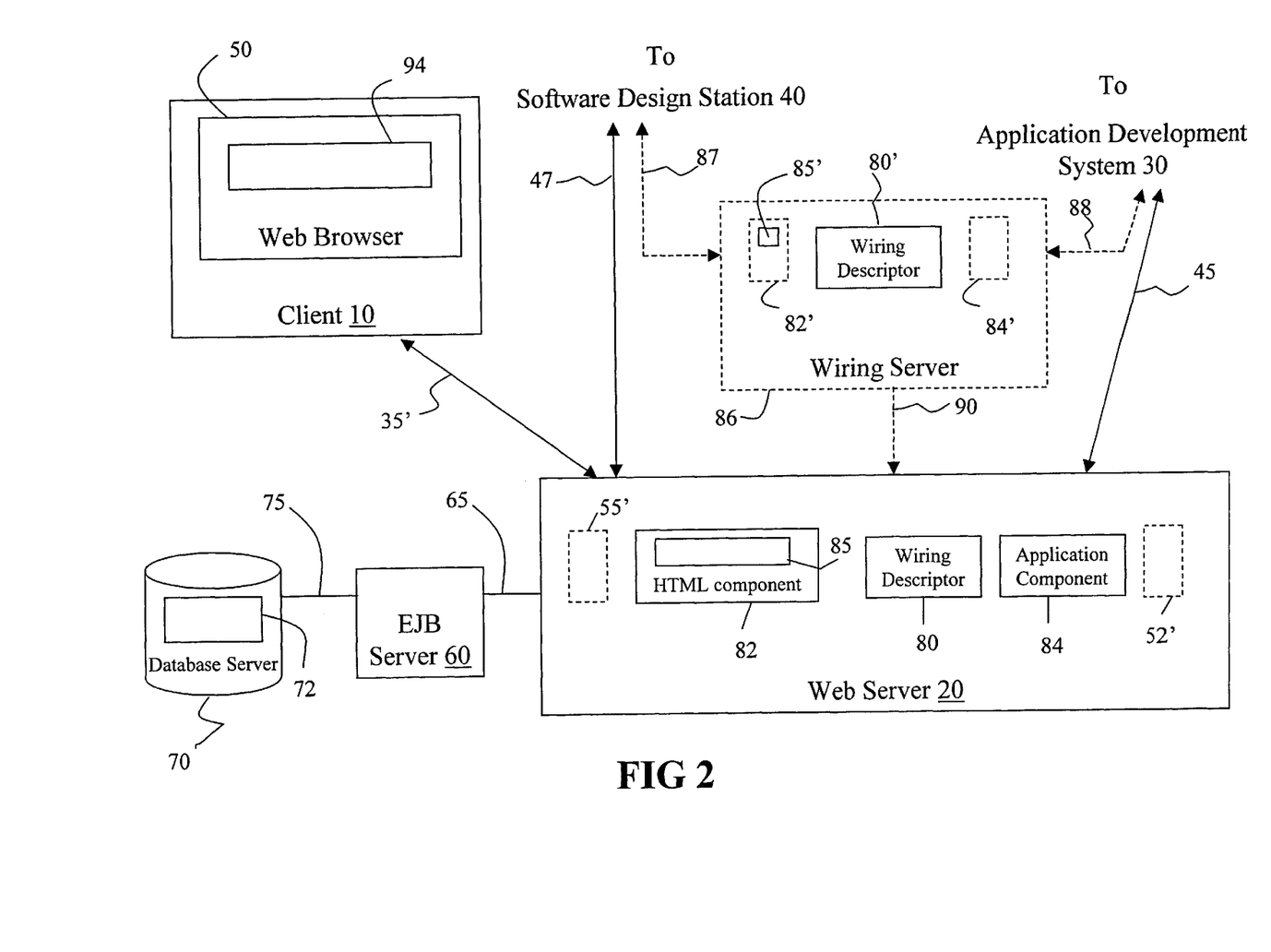
FIG. 2 is a more detailed block diagram of an exemplary embodiment of a computer network in accordance with the invention.

FIG. 2 illustrates a block diagram of an exemplary embodiment of the computer network 2 including the web server 20, an EJB server 60, and a database server 70. The web server 20 is in communication with the Enterprise Java Beans (EJB) server 60 over an EJB communication channel 65. The EJB server 60 is additionally in communication with the database server 70 over a database communication channel 75.

The database server 70, often called the "back end" tier of a computer network 2, stores and manages data. The web server 20 accesses the information stored on the database server 70 by interfacing with a database software program 72. In one embodiment, the database software 72 maintains the web server 20 data or EJB server 60 data in a Lightweight Directory Access Protocol (LDAP) data model. In other embodiments, the database software 72 stores data in an ODBC-compliant database. For example, the database software 72 may be provided as an ORACLE database, manufactured by Oracle Corporation of Redwood Shores, Calif. In other embodiments, the database software 72 can be a Microsoft ACCESS database or a Microsoft SQL server database. The database server 70 retrieves data from local memory and transmits the data to the EJB server 60 over the database communication channel 75 and consequently to the web server 20 over the EJB communication channel 65.

The EJB server 60, which is often referred to as a "middleware" server, handles the non-application details and hosts (i.e., executes) EJB containers. An EJB container contains an EJB component, which is a Java component (like a traditional Java Bean) that implements business logic, such as transactions. The EJB server 60 provides services such as transaction and resource management, versioning, scalability, mobility, persistence, and security to the EJB component. Consequently, the EJB server 60 supports application components. In one embodiment, the EJB server 60 uses Remote Method Invocation (RMI) as the transport protocol over the EJB communication channel 65. In another embodiment, the EJB server 60 uses Internet Inter-ORB Protocol (IIOP) as the transport protocol over the EJB communication channel 65. An example of an EJB server 60 is the Oracle8i Jserver, manufactured by Oracle Corporation of Redwood Shores, Calif. One skilled in the art will realize that any server that can host an EJB container and provide the EJB container with the necessary services can be an EJB server 60.

The web server 20 also includes a wiring descriptor 80, a completed HTML component 82, and a completed application component 84. The wiring descriptor 80, as described further in FIG. 3 and in one embodiment, is a declarative XML file, or document, that the web server 20 uses to delineate a relationship between an HTML UI element 85 (included within the HTML component 82) and an application component 84. Moreover, the wiring descriptor 80 enables separation between the development of the application component 84 and the HTML component 82 (i.e., the HTML UI element 85).

Further, the web server 20 includes an XML processor, or parser (not shown). The XML processor is a software module that reads XML files and provides access to the contents and structure of the XML files. In one embodiment, the XML parser is a nonvalidating parser, which reads the XML files and produces error messages when the XML parser receives an XML file that is not well-formed (i.e., an XML file that does not follow the notational and structural rules for XML). In another embodiment, the XML parser is a validating parser, which, in addition to performing the functions of an XML nonvalidating parser, also confirms whether the XML document is valid (i.e., the structure and number of tags makes sense). An example embodiment of the XML processor is the XML4J Parser, developed by IBM Corporation of Armonk, N.Y.

The HTML component 82 is a completed software component that the software design station 40 transmits to the web server 20 over the software component communication channel 47. The application component 84 is a software component that the application development system 30 transmits to the web server 20 over the application communication channel 45. The web server 20 transmits a web page to the client 10 for display on the web browser 50. In one embodiment, the user requests the execution of an application program on the web server 20. In this embodiment illustrated in FIG. 2, the web server 20 executes the desired application program (i.e., application component 84) and communicates with HTML elements (i.e., HTML element 94) via manipulating HTML elements (i.e., HTML element 85). An HTML element 94 provides a remote interface for the application component 84 that is executing on the web server 20. Each HTML element (i.e., HTML element 94) is represented as a UI element (i.e., UI element 85) in the web server 20.

Although an HTML element (e.g., HTML element 94) and a software component (e.g., application component 84) implement the same interface, the HTML element and the software component are separate classes. A software component (e.g., an application component 84) executes on a server (e.g., the web server 20). The HTML element resides on a client (e.g., the client 10) and provides a remote interface to execute the software component's methods. For example, a television is similar to a software component and the television remote control is similar to an HTML element. The television remote control and the television have the same buttons on the front (i.e., the same interface), but each device performs a different function. Pushing a button (e.g., volume increase) on the television remote is equivalent to pushing the same button (e.g., volume increase) on the television, even though the television (and not the television remote) actually performs the function (e.g., increasing the volume).

Although the method and apparatus of the present invention is described in the context of a web server 20, those skilled in the art will recognize that any web (or application) server 20 that supports a servlet engine can store and execute the wiring descriptor 80. In another embodiment shown in FIG. 2, a remote wiring server 86 stores a wiring descriptor 80', an HTML component 82' having an HTML UI element 85', and an application component 84'. The remote wiring server 86 is in communication with the software design station 40 over a component wiring communication channel 87 and is in communication with the application development system 30 over an application wiring communication channel 88. Additionally, the wiring server 86 is in communication with the web server 20 over a wiring communication channel 90.

Figure 3:
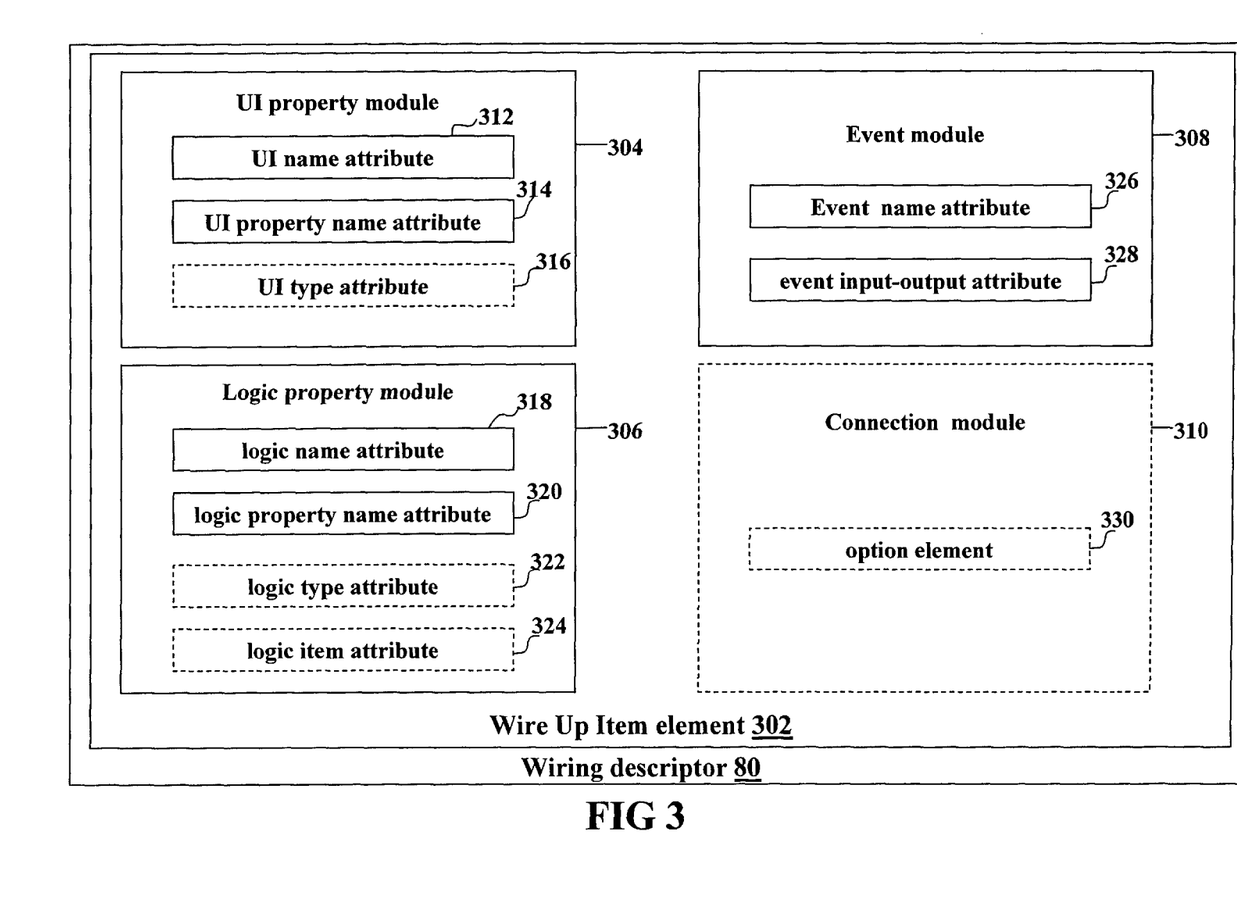
FIG. 3 is a block diagram of an embodiment of a wiring descriptor.

FIG. 3 shows an exemplary wiring descriptor 80. In brief overview and in the embodiment depicted in FIG. 3, the wiring descriptor 80 is a declarative description file. In a further embodiment, and as described throughout this specification, the wiring descriptor 80 is a declarative XML file. However, one skilled in the art will realize that the wiring descriptor 80 can be a file written in any declarative markup language including, without limitation, Dynamic HTML (DHTML), Wireless Markup Language (WML), Document Object Model (DOM), Java Speech Markup Language (JSML), and the like. Additionally, the wiring descriptor 80 can be written in traditional programming and/or scripting languages, such as, but not limited to, Java, JavaScript, Visual Basic, C++ (Visual Basic and C++ use Active-X), and the like.

When written in a markup language, such as XML, the wiring descriptor 80 is associated with a document type definition (DTD). The DTD is the grammar for a markup language and defines the tags that the markup language has, what the attributes of those tags can be, and how these attributes can be combined. When the web server 20 includes a validating XML parser, the validating XML parser confirms whether the XML document is valid (i.e., the structure and number of tags makes sense) by comparing the XML document to its DTD. An example of the DTD for the wiring descriptor 80 appears in Appendix A.

The wiring descriptor 80 contains a set of relations. Each relation connects a property, or characteristic, of an HTML UI element 85 to a property of an application component 84. Each relation consists of two parts. The first part identifies the property of an application component 84 or HTML UI element 85 in the context of their respective software classes. The second part defines the event that causes synchronization of the chosen properties to achieve correct input behavior of the application component 84 and correct output behavior of the HTML UI element 85 that the client 10 displays. Additionally, each relation is either an input relation or an output relation. An input relation identifies what UI events in the HTML UI element 85 cause the value change of the corresponding property of the application component 84. An output relation identifies what events in the application component 84 need to result in the redisplaying of the value of an HTML UI element 85.

More specifically, the wiring descriptor 80 includes a WireUpItem element 302. Although the wiring descriptor 80 is described as having one WireUpItem element 302, those skilled in the art will realize that the wiring descriptor 80 can include multiple WireUpItem elements 302. In one embodiment and as shown in FIG. 3, the WireUpItem element 302 contains a UI property module 304, a logic property module 306, and an event module 308. The UI property module 304 has a UI name attribute 312 and a UI propertyName attribute 314. The UI name attribute 312 corresponds to the identification of the HTML UI element 85. The UI propertyName attribute 314 identifies the property of the HTML UI element 85. In one embodiment depicted in FIG. 3, the UI property module 304 further includes a type attribute 316. The UI type attribute 316 corresponds to the data type of the HTML UI element 85.

The logic property module 306 uniquely identifies the property of an application component 84. The logic property module 306 includes a logic name attribute 318 and a logic propertyName attribute 320. The logic name attribute 318 uniquely identifies the application component 84. The logic propertyName attribute 320 identifies the property of the application component 84. Similar to the UI property module 304, in one embodiment the logic property module 306 further includes a logic type attribute 322. The logic type attribute 322 corresponds to the data type of the application component 84. In one embodiment, the web server 20 uses the type attributes 316, 322 to automate type transformations.

In a further embodiment shown in FIG. 3, the logic property module 306 also includes a logic item element 324. The wiring descriptor 80 uses the logic item element 324 of the logic property module 306 to map a complex UI type (e.g., a multiple column HTML table) with a complex application component property (i.e., a property consisting of a set of sub-properties). Each logic item element 324 has multiple items (not shown). Each item has a name attribute (not shown) and a type attribute (not shown). The name attribute of an item identifies a sub-property (not shown) of the logic property 306 and the type attribute of an item identifies the data type (e.g., integer, string) of the sub-property.

The event module 308 identifies an event that triggers synchronization, as described further below, between the property of the UI element 85 (i.e., value of the property identified by the UI propertyName attribute 314) and the property of an application component 84 (i.e., value of the property identified by the logic propertyName attribute 320). The event module 308 includes an event name attribute 326 and an event input-output attribute 328. The event name attribute 326 identifies the event that triggers synchronization and the event input-output attribute 328 identifies the direction of synchronization, as described in more detail in FIG. 4.

In further embodiments, the WireUpItem element 302 includes a connection module 310. The wiring descriptor 80 uses the connection module 310 for dynamic user interfaces. The connection module 310 can have one or multiple option elements 330. Each option element 330 has an option value attribute (not shown), an option fragment attribute (not shown), and an option wiring attribute (not shown). The option value attribute is matched with the value of the property of the application component 84. The option fragment attribute (not shown) identifies an HTML fragment, which is described in greater detail in FIG. 7. The option wiring attribute (not shown) identifies a wiring descriptor that is associated with the HTML fragment.

Figure 4:
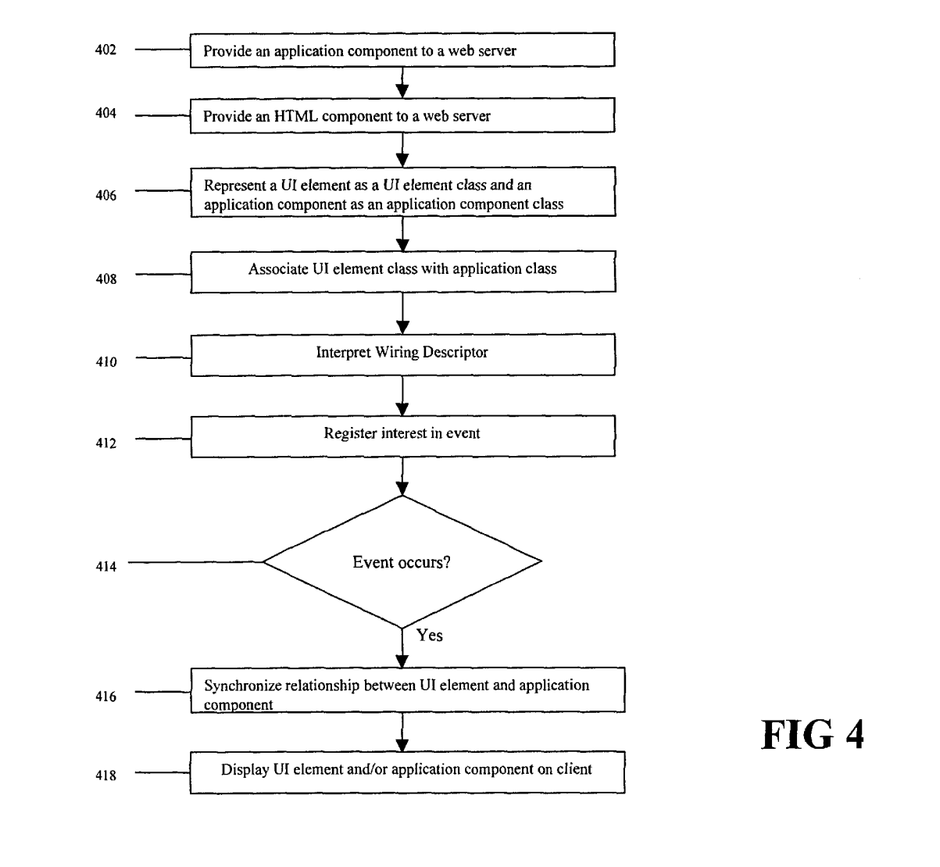
FIG. 4 is a flow diagram of an embodiment of a process used to synchronize a user interface element displayed on a client and a software application component executing on a web server.

Referring now to FIG. 4, a flow diagram depicts one embodiment of the steps taken by the web server 20 to synchronize an HTML UI element 85 (within the HTML component 82) displayed on the client 10 with an application component 84 typically executing on the web server 20. The application development system 30 provides (step 402) an application component 84 to the web server 20 over the application communication channel 45. The software design station 40 provides (step 404) an HTML component 82 having an HTML UI element 85 to the web server 20 over the software component communication channel 47.

The web server 20 then represents (step 406) the HTML UI element 85 as a UI element object, or class, and represents the application component 84 as an application object, or class. The UI element class specifies the attributes of the HTML UI element 85 and the functions that the HTML UI element 85 performs. The application class specifies the attributes of the application component 84 and the functions that the application component 84 performs. In one embodiment, the web server 20 forms the UI element class from the UI property module 304 and the event module 308 and forms the application class from the logic property module 306 and the event module 308. In a further embodiment, the web server 20 forms the respective classes with the respective property modules 304, 306, the event module 308 and, additionally, the connection module 310.

The web server 20 then uses the wiring descriptor 80 to associate (step 408) the UI element class with the application class. More specifically, the web server 20 associates the UI name attribute 312, which corresponds to the identification of the HTML UI element 85, with the logic name attribute 318, which identifies the application component 84. The web server 20 further associates the UI propertyName attribute 314, which identifies the property of the HTML UI element 85, with the logic propertyName attribute 320, which identifies the property of the application component 84. Additionally, the web server 20 uses the event module 308 to identify an event that triggers synchronization between the property of the UI element (i.e., UI propertyName attribute 314) and the property of an application component 84 (i.e., logic propertyName attribute 320).

In one embodiment, if the value of the event input-output attribute 328 of the event module 308 is equivalent to "input", then the wiring descriptor 80 sets the value of the property of the application component 84 equal to the value of the property of the HTML UI element 85. If the value of the event input-output attribute 328 is equivalent to "output", then the wiring descriptor 80 sets the value of the property of the HTML UI element 85 equal to the value of the property of the application component 84. As illustrated in the above description, the wiring descriptor 80 enables separation between the development of the application component 84 and the HTML component 82.

At runtime, the web server 20 interprets (step 410) the wiring descriptor 80. In one embodiment, the web server 20 employs the XML parser, as described above, to parse the wiring descriptor 80. The web server 20 then registers (step 412) an interest in the events previously identified in the event module 308. The web server 20 waits for the event to occur (step 414). In one embodiment, the web server 20 polls the client 10 and the web server 20 to determine if the event identified in the event module 308 occurs. In another embodiment, the client 10 notifies the web server 20 upon the occurrence of the event (i.e., a callback). When one of the registered events occurs, the web server 20 synchronizes (step 416) the value of the property of the HTML UI element 85 (i.e., UI propertyName attribute 314) and the value of the property of the application component 84 (i.e., logic propertyName attribute 320).

After synchronization, the web server 20 displays (step 418) the HTML UI element 85 on the client 10. In one embodiment, the web server 20 uses a Java Server Page (JSP) to display the HTML UI element 85 on the client 10. In another embodiment, the web server 20 uses a server-side Document Object Model (DOM) to periodically update the web page (i.e., updates to the application component 84 and/or the HTML UI element 85) that the user views on the web browser 50 (i.e., server-push model). Alternatively, the client 10 uses remote DOM to periodically request and/or download updates to the web page that the web server 20 transmits over the web communication channel 35 (i.e., client-pull model).

Figure 5A:
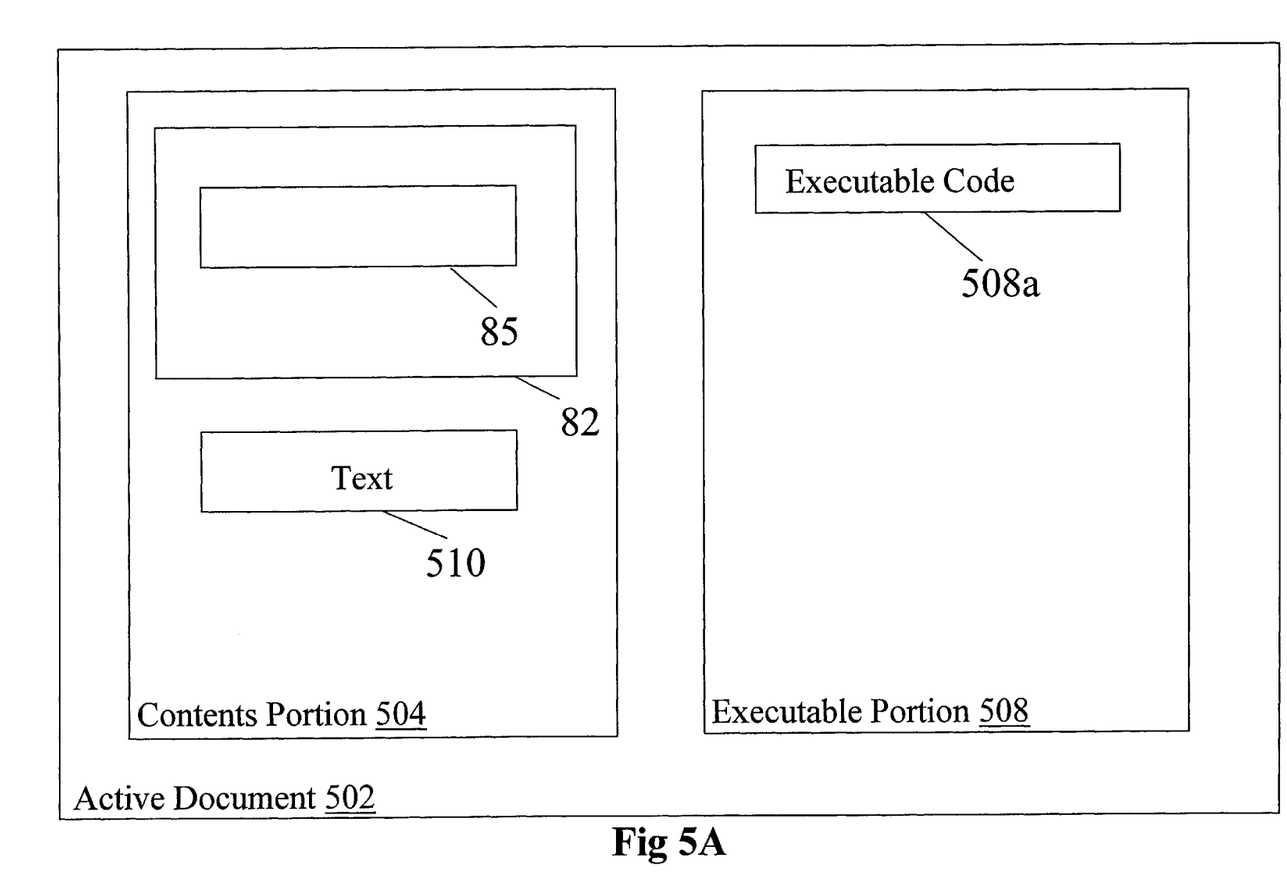
FIG. 5A is a block diagram of an embodiment of an active document.

In more detail about the display of the HTML component 82 on the client 10 and also referring to FIG. 5A, in one embodiment the computer network 2 permits a user acting on the client 10 to communicate with the web server 20 to access an interactive web page 502, which is also referred to herein as an active document. An active document 502 generally contains at least two portions, or components, a "contents" portion 504 and an "executable" portion 508. The contents portion 504 of the active document 502 includes the HTML component 82 (e.g., scroll bars, buttons, menu bars, tables, calendars, calculators). The executable portion 508 of the active document 502 creates or modifies the HTML component 82 (i.e., the HTML UI element 85) associated with the active document 502 while the user is interacting with the active document 502. The executable portion 508 may include executable code 508a. The executable portion 508 of the active document 502 may be provided as an applet, script or any other form of executable code.

As a simple example, and using the embodiment depicted in FIG. 5A, the active document 502 includes a text component 510 that is initially displayed in black. Executable code 508a monitors the position of the cursor on the display and when the cursor is placed over the text component 510, the executable code 508 alters the content of the text component 510, the color characteristic, from black to red. Thus changes in the text component 510 occur in response to the movement of the cursor over the displayed active document 502.

Figure 5B:
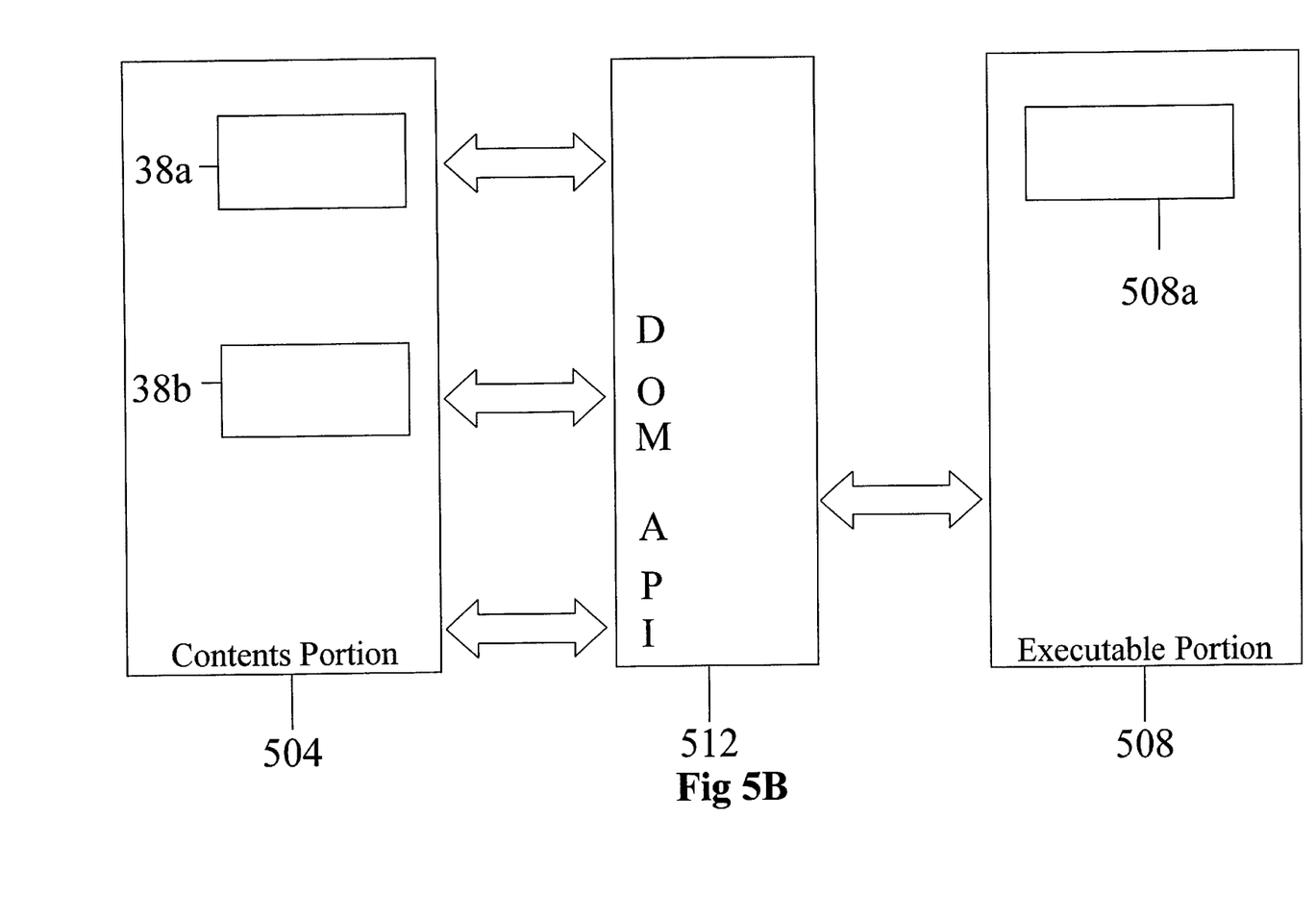
FIG. 5B is a logical diagram of an embodiment of an active document in which an application-programming interface for manipulating the content components of the active document is provided.

Referring to FIG. 5B and in a further embodiment, each content component 504 is described by a DOM and the DOM exposes an Application Programming Interface (DOM API) 512 to the executable portion 508. As described in more detail below, the executable portion 508 of the active document 502 remains on the web server 20 while the contents portion 504 is transmitted to the client 10. Thus, the DOM API 512 functions are performed over the web communication channel 35. The DOM API 512 allows the executable portion 508 to manipulate content components 504 of the active document 502 in a standard way. Because the DOM API 512 is standardized, content components 504 may be manipulated in a standard way regardless of the web browser 50 used to display the active document 502.

Figure 5C:
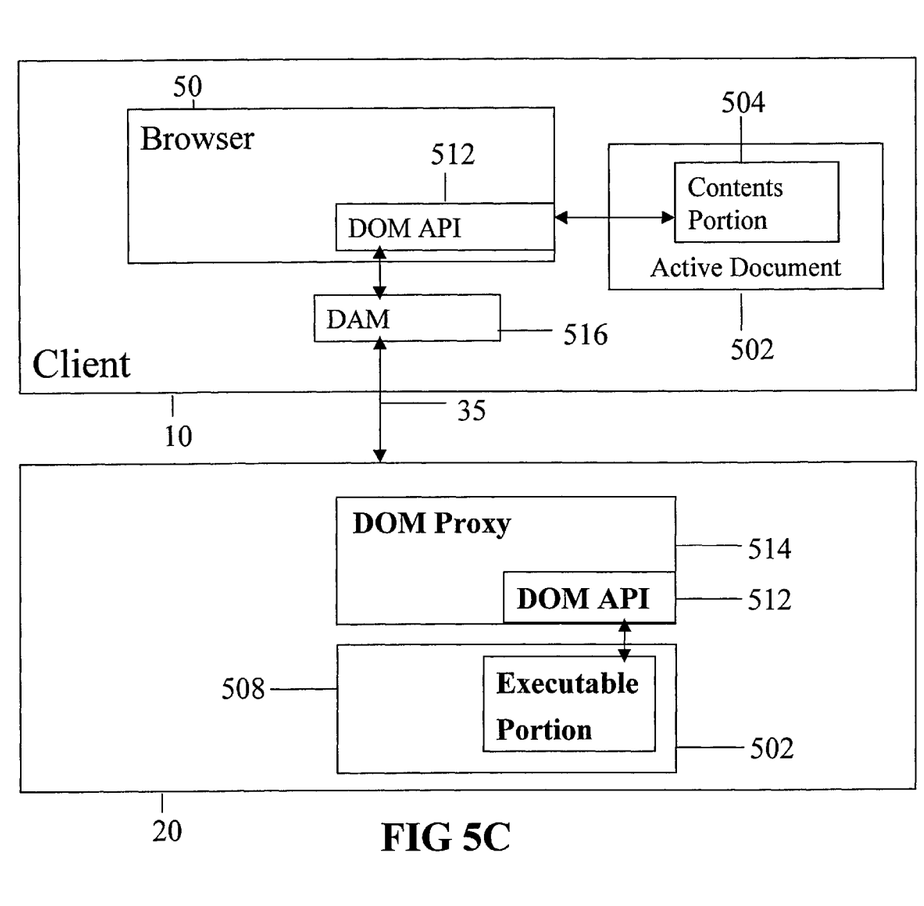
FIG. 5C is a block diagram of an embodiment of a system for providing and displaying an active document in a client/server environment.

In more detail and referring to FIG. 5C, the client 10 accesses the active document 502 over the web communication channel 35. In this embodiment, only the content components 504 are transmitted to the client 10. The executable portion 508 of the active document 502 is retained on the web server 20. In response to a user request from the client 10 for the active document 502, the web server 20 transmits over the web communication channel 35 the content components 504 of the active document 502 to the client 10. The content components 504 may be transmitted all together, or each component 504 may be transmitted as the web browser 50 encounters it, i.e., the components 504 may be transmitted "on demand."

The web server 20 provides a DOM Proxy 514, which includes the DOM API 512. The executable portion 508 of the active document 502 issues commands to the DOM Proxy 514 and receives output from the DOM Proxy 514 as if it were directly interacting with the DOM API 512 provided by the web browser 50. The DOM Proxy 514 may accept more commands than the DOM API 512 does. In this embodiment, the DOM Proxy 514 translates additional commands into one or more commands the DOM API 512 provides. In some embodiments, the DOM API 512 provided by the DOM Proxy 514 may be enhanced to provided additional functionality, or it may conform to the DOM Level 0 specification or DOM Level 1 specification promulgated by the World Wide Web Consortium.

The DOM Proxy 514 receives commands from the executable portion 508 of the active document 502 and transmits them to the client 10 via the web communication channel 35. The DOM Proxy 514 may also receive data from the client 10 over the web communication channel 35 and provide the received data to the executable portion 508 of the active document 502. The DOM Proxy 514 may be provided as a servlet or application program. For example, the DOM Proxy 514 may be provided as a Java Bean or an Active X control. Alternatively, the DOM Proxy 514 may be provided by modifying the web browser 50 to transmit data over the web communication channel 35 rather than rendering the results of DOM API commands as visual display.

The client 10 also includes a DOM Access Module (DAM) 516. The DAM 516 communicates with the DOM Proxy 514 over the web communication channel 35. The DAM 516 issues DOM API calls to the DOM API 512 provided by the web browser 50 in response to data received from the DOM Proxy 514 over the web communication channel 35. The DOM Proxy 514 and the DAM 516 may pack and unpack data for transfer over the web communication channel 35. Alternatively, the DOM Proxy 514 and the DAM 516 may enhance a standard protocol or provide their own protocol for transmission of data. The DAM 516 may be provided as a script, applet, plug-in or application component 84. For example, the DAM 516 may be provided as a Java Bean or an Active X control.

In one embodiment, the protocol used by the DAM 516 and the DOM Proxy 514 allows the DOM Proxy 514 to indicate that it should receive notification of certain events occurring on the client 10. In these embodiments, the DOM Proxy 514 associates a handler routine with the event name attribute 326 of the event module 308 (which identifies the event in which it has an interest), such as a "MouseClicked" event. When that event occurs on the client 10, the DAM 516 notifies the DOM Proxy 514. In one embodiment, the DAM 516 notifies the DOM Proxy 514 by sending a message to the DOM Proxy 514 indicating the event has occurred and includes a copy of the event name attribute 326 and, optionally, a description of the event. The DOM Proxy 514 may also indicate that it is no longer interested in an event by sending a message to the DAM 516 including a copy of the event name attribute 326 identifying the event. In a particular embodiment, the DAM 516 responds to such a message with an acknowledgement, allowing the DOM Proxy 514 to release the binding between the event name attribute 326 and the handler for the event, e.g., the DOM Proxy 514 can remove an entry in a table associating the handler and the event.

Figure 6:
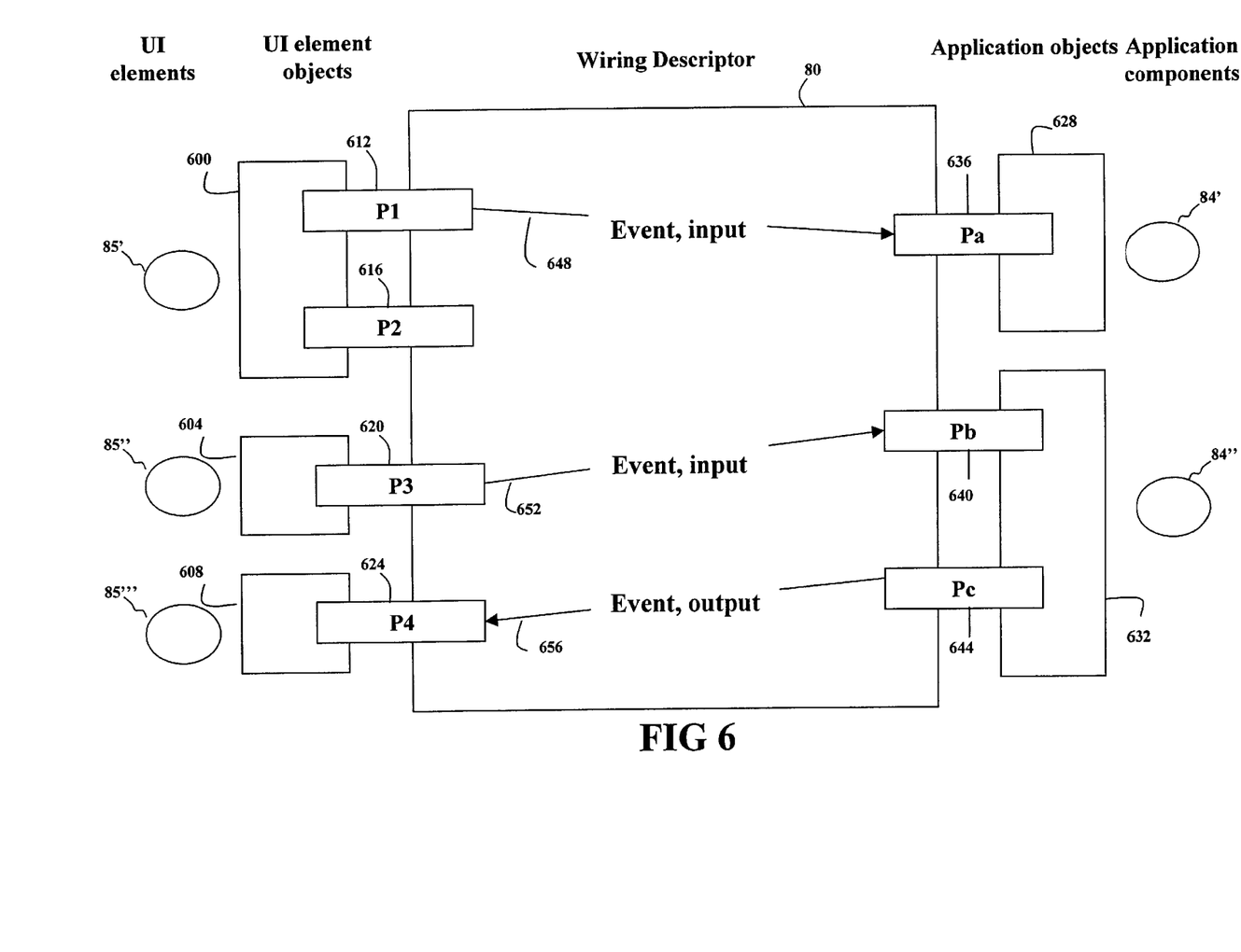
FIG. 6 is a block diagram of an exemplary embodiment of a wiring descriptor associating the properties of software objects with the properties of application objects.

FIG. 6 shows an exemplary embodiment of the wiring descriptor 80 associating the properties of software objects with the properties of application objects. As described above, the software design station 40 provides a first, second, and third HTML UI element 85', 85", and 85'" (generally 85), respectively, to the web server 20 over the software component communication channel 47. Similarly, the application development system 30 provides the web server 20 with a first and a second application component 84', 84" (generally 84), respectively, over the application communication channel 45. The web server 20 then represents each HTML UI element 85', 85", and 85'" as a UI element object 600, 604 and each application component 84', 84" as an application object 628. The wiring descriptor 80 consequently enables separation between the development of the application component 84 and the HTML component 82 (i.e., the HTML UI element 85).

The first UI element object 600 contains a first UI property P1 612 and a second UI property P2 616. Further, the second UI element object 604 contains a third UI property P3 620 and the third UI element object 608 consists of a fourth UI property P4 624. The first application object 628 contains a first application property Pa 636. The second application object 632 contains a second application property Pb 640 and a third application property Pc 644.

The wiring descriptor 80 further identifies (with a corresponding event name attribute 326 and event input-output attribute 328 of the event module 308) a first input event 648 to cause synchronization between the first UI property P1 612 of the first UI element object 600 with the first application property Pa 636 of the first application object 628. Similarly, the wiring descriptor 80 identifies (with a corresponding event name attribute 326 and event input-output attribute 328 of the event module 308) a second input event 652 to synchronize the third UI property P3 620 with the second application property Pb 640. Finally, the wiring descriptor 80 identifies (with a corresponding event name attribute 326 and event input-output attribute 328 of the event module 308) an output event 656 to synchronize the fourth UI property P4 624 with the third application property Pc 644.

Figure 7:
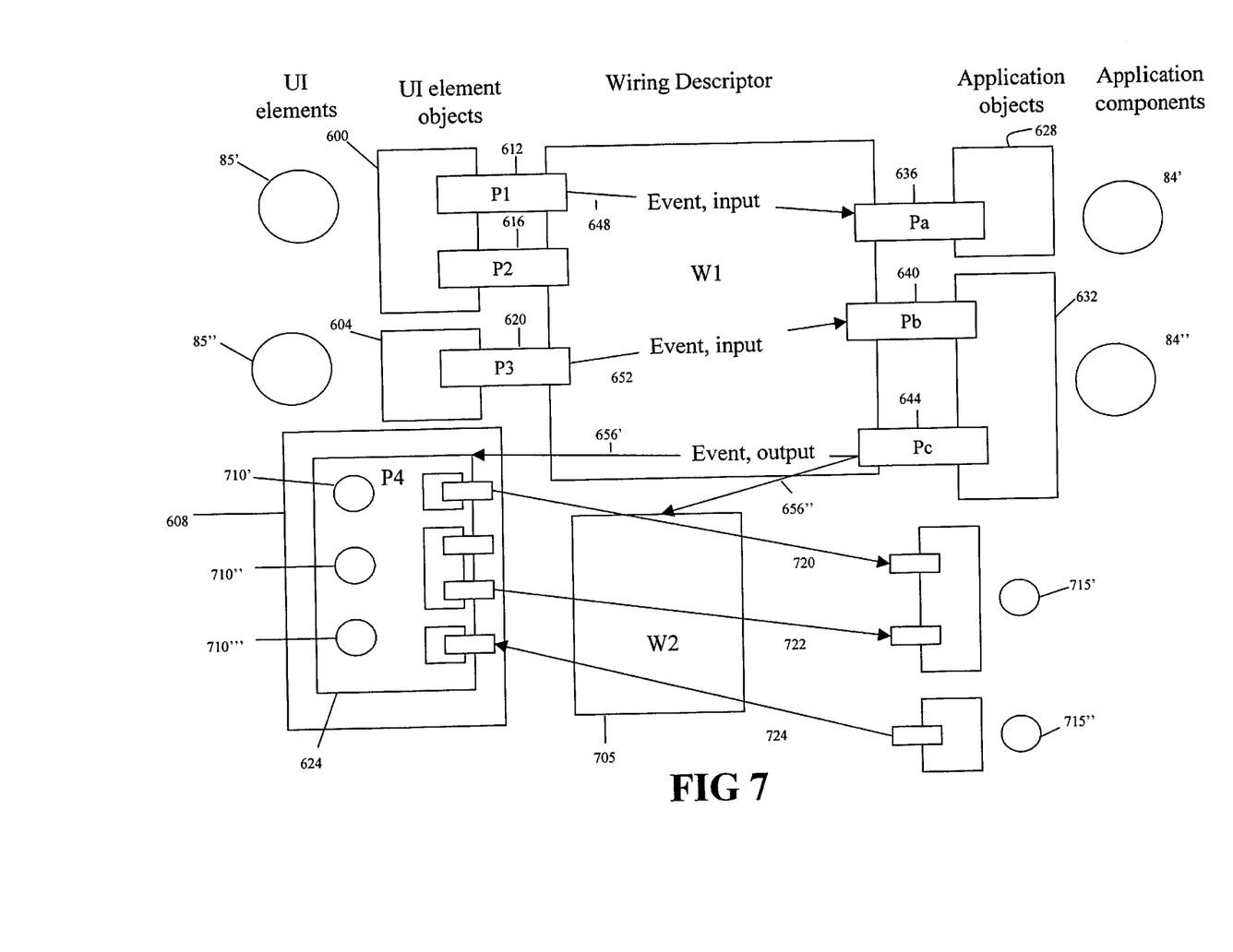
FIG. 7 is a block diagram of an exemplary embodiment of a wiring descriptor that includes a web fragment.

In a further embodiment and also referring to FIG. 7, HTML developers use an HTML fragment to design their web pages (or HTML components 82). An HTML fragment is a piece of pre-designed HTML software that has zero or more HTML UI elements 85. More specifically, an HTML developer obtains an HTML fragment from another web site (e.g., a web page graphic) for use in the HTML developer's web page. An HTML UI element 85 in an HTML web page (or fragment) is a placeholder for further fragments. Therefore, when the web server 20 attempts to display the placeholder element 85 on the client 10, the web server 20 substitutes the HTML fragment during execution of the wiring descriptor.

In greater detail, the fourth UI property P4 624 of the UI element object 608 is a placeholder for an HTML fragment (not shown). As previously described above and in one embodiment, the wiring descriptor 80 identifies (with a corresponding event name attribute 326 and event input-output attribute 328 of the event module 308) the output event 656' to synchronize the fourth UI property P4 624 with the third application property Pc 644. However, the fourth UI property P4 624 is the placeholder for the HTML fragment. The HTML fragment has a W2 fragment wiring descriptor 705 to describe the relationship between HTML UI elements 710', 710", 710'" (generally 710) of the fragment with the application properties of the application components that the fragment employs. As previously described above for the wiring descriptor 80, the fragment wiring descriptor 705 represents the HTML UI elements 710 included in the HTML fragment as UI element objects. The fragment wiring descriptor 705 also represents the application components 715', 715" (generally 715) that are associated with the HTML fragment as application objects.

The web server 20 interprets the value associated with the UI property modules P1 612, P2 616, P3 620, P4 624 and the value associated with the logic property modules Pa 636, Pb 640, Pc 644 to determine whether to use a fragment. For instance, because the wiring descriptor 80 associates the fourth UI property P4 624 (i.e., placeholder for fragment) with the third application property Pc 644, the web server 20 interprets the wiring descriptor 80 to determine that a new fragment needs to be displayed on the client 10 when the value of the third application property Pc 644 changes. The web server 20 determines that a new fragment is displayed on the client 10 because the event input-output attribute 328 for the output event 656', 656" is equivalent to "output." The web server 20 also determines that the web server 20 will use the fragment wiring descriptor 705 for the relations associated with the fragment. Therefore, the output event 656', 656" synchronizes the fourth UI property P4 624 with the third application property Pc 644 and additionally causes the web server 20 to use the fragment wiring descriptor 705. The web server 20 consequently interprets the fragment wiring descriptor 705 and registers interest in the named events 720, 722, 724.

When software developers use multiple HTML fragments in the design of their web page (and therefore many wiring descriptors), the web server 20 selects the HTML fragment based on the value of a property (e.g., P1 612, P2 616, P3 620, P4 624, Pa 636, Pb 640, Pc 644). More specifically, if the value of the third application property Pc 644 changes to a different value, the web server 20 can use a different fragment and/or a different wiring descriptor (e.g., W3).

Referring to Appendix B, an example of the wiring descriptor 80 that maps a complex UI type (i.e., a multiple column HTML table) to a set of application component properties is shown. The relation between the HTML table "ResultTable" and the property "result" contains multiple properties, each of which are identified by a logic item element 324. The item name attribute of the logic item element 324, as described above, identifies the application component 84 (e.g., "Price", "Town", "NumberOfBeds", etc.) and the item type attribute of the logic item element 324 identifies the data type (e.g., integer, string) of the application component 84. In one embodiment, the displaying order of these properties in an HTML component 82 is in the order the HTML UI elements 85 are specified.

Having described certain embodiments of the invention, it will now become apparent to one of skill in the art that other embodiments incorporating the concepts of the invention may be used.

Appendix A

```
<!-- DTD for wireup description -->
<!DOCTYPE WireUp [
<!ELEMENT WireUp (WireUpItem+)>
<!ELEMENT WireUpItem (UI, Logic, Event, Connection?)>
<!ELEMENT UI EMPTY>
<!ATTLIST UI       type           NMTOKEN       #REQUIRED
                   name           NMTOKEN       #REQUIRED
                   propertyName   NMTOKEN       #REQUIRED
                   propertyType   NMTOKEN       "String">
<!ELEMENT Logic    (Item*)>
<!ATTLIST Logic    type           NMTOKEN       #REQUIRED
                   name           NMTOKEN       #REQUIRED
                   propertyName   NMTOKEN       #REQUIRED
                   propertyType   NMTOKEN       "String">
<!ELEMENT Item Empty>
<!ATTLIST Item     name           NMTOKEN       #REQUIRED
                   type           NMTOKEN       #REQUIRED
<!ELEMENT Event EMPTY>
<!ATTLIST Event    name           NMTOKEN       #REQUIRED
                   input-output   (input | output)  "input">
<!ELEMENT Connection Option+>
<!ELEMENT Option EMPTY>
<!ATTLIST Option   value          NMTOKEN       #REQUIRED
                   fragment       NMTOKEN       #REQUIRED
                   wiring         NMTOKEN       #REQUIRED>
]>
```

Appendix B

```
<WireUpItem>
<UI
    type =              "HTMLTableElement"
    name =              "ResultTable"
    propertyName    =   "TableBody"
    propertyType    =   "HTMLTableSectionElement"
/>
<Logic
    type =              "EstateAgent.pb.EstatePBean1"
    name =              "EstatePBean1"
    propertyName    =   "result"
    propertyType    =   "Estate"
    <Item name      =   "Price"             type    =   "java.lang.Integer"/>
    <Item name      =   "Town"              type    =   "java.lang.String"/>
    <Item name      =   "NumberOfBeds"      type    =   "java.lang.Integer"/>
    <Item name      =   "Location"          type    =   "java.lang.Integer"/>
    <Item name      =   "Type"              type    =   "java.lang.String"/>
    <Item name      =   "Style"             type    =   "java.lang.String"/>
    <Item name      =   "Parking"           type    =   "java.lang.String"/>
    <Item name      =   "Address"           type    =   "java.lang.String"/>
</Logic>
<Event name         =   "PropertyChange"            input-output =      "output"/>
<WireUpItem>
```

What is claimed is:

1. A method for synchronizing a user interface element displayed on a client and a software application component executing on a web server, said method comprising:
   (a) representing a user interface element as a user interface element component having a characteristic;
   (b) providing a wiring descriptor relating said characteristic of said user interface element component with a characteristic of a software application component;
   (c) executing said wiring descriptor to associate said user interface element component with said software application component; and
   (d) synchronizing said characteristic of said user interface element component with said characteristic of said software application component.

2. The method of claim 1 wherein synchronizing said characteristic comprises updating said user interface element using said synchronized characteristic of said user interface element component.

3. The method of claim 2 further comprising using Document Object Model to update said user interface element displayed on said client.

4. The method of claim 1 wherein providing a wiring descriptor further comprises providing a description file.

5. The method of claim 1 wherein providing a wiring descriptor further comprises identifying said characteristic of said user interface element component.

6. The method of claim 1 wherein providing a wiring descriptor further comprises identifying a fragment of a web page.

7. The method of claim 1 wherein providing a wiring descriptor further comprises identifying said characteristic of said software application component.

8. The method of claim 1 wherein providing a wiring descriptor further comprises identifying an event to synchronize said characteristic of said user interface element component and said characteristic of said software application component.

9. The method of claim 8 further comprising registering an interest in said event.

10. The method of claim 8 further comprising synchronizing said characteristic of said user interface element component with said characteristic of said software application object when said event occurs.

11. A method for synchronizing a user interface element displayed on a client and a software application component executing on a web server, said method comprising:
   (a) representing, by a web server, a user interface element displayed on a client as a user interface element component on said web server, said user interface element component having a characteristic;
   (b) providing, to said web server, a description file having a user interface property module, a logic property module, and an event property module;
   (c) using, by said web server, a user interface name attribute of said user interface property module to identify said user interface element component;
   (d) using, by said web server, a user interface property name attribute of said user interface property module to identify said characteristic of said user interface element component;
   (e) using, by said web server, a logic name attribute of said logic property module to identify a software application component;
   (f) using, by said web server, a logic property name attribute of said logic property module to identify a characteristic of said software application component;
   (g) using, by said web server, said event property module to identify an event to trigger synchronization between said characteristic of said user interface element component and said characteristic of said software application component;
   (h) associating, by said web server, said user interface name attribute with said logic name attribute and said user interface property name attribute with said logic property name attribute;
   (i) synchronizing, by said web server in response to the occurrence of said event, said characteristic of said user interface element component and said characteristic of said software application component; and
   (j) providing, by said web server to said client for display by said client, a representation of said synchronized characteristic of said user interface element component.

12. An apparatus for synchronizing a user interface element displayed on a client and a software application component executing on a web server, said apparatus comprising:

(a) a user interface property module identifying a characteristic of a user interface element component;

(b) a logic property module identifying a characteristic of a software application component; and (c) an event module identifying an event to synchronize said characteristic of said user interface element component and said characteristic of said software application component when said event occurs.

13. The apparatus of claim 12 further comprising a database server that stores and manages data.

14. The apparatus of claim 12 further comprising a middleware server in communication with said web server and said database server.

15. The apparatus of claim 14 wherein said middleware server consolidates requests and responses between said web server and said database server.

16. The apparatus of claim 15 wherein said middleware server hosts and supports components of said software application.

17. The apparatus of claim 12 wherein said software application is a Java Bean written in Java programming language.

18. The apparatus of claim 12 wherein said user interface element component is an HTML component.

19. The apparatus of claim 12 further comprising a software design station providing said user interface element.

20. The apparatus of claim 12 wherein said web server represents said user interface element as a user interface element component having said characteristic.

21. The apparatus of claim 12 further comprising an application development system providing said software application component.

22. The apparatus of claim 12 wherein said web server further comprises a Document Object Model (DOM) proxy to update said user interface element displayed on said client.

23. The apparatus of claim 22 wherein said client further comprises a DOM Access Module to accept said update from said DOM proxy and to transmit a change in said user interface element.

24. The apparatus of claim 12 wherein a description file describes at least one of said user interface property module, said logic property module, and said event module.

25. The apparatus of claim 24 wherein said description file is in XML format.

26. The apparatus of claim 12 wherein at least one of said user interface property module, said logic property module, and said event module further comprises type information to automate type transformations.

27. The apparatus of claim 12 wherein said event module further comprises an input-output attribute to specify a direction of said synchronizing.

28. The apparatus of claim 12 further comprising a connection module that specifies a dynamic user interface.

29. The apparatus of claim 28 wherein said dynamic user interface is an HTML fragment.

30. The apparatus of claim 28 wherein said connection module further comprises a value attribute, said value attribute made equivalent to said characteristic of said a software application component.

31. The apparatus of claim 28 wherein said connection module further comprises a fragment attribute, said fragment attribute identifying said HTML fragment.

32. The apparatus of claim 28 wherein said connection module further comprises a wiring attribute, said wiring attribute identifying at least one of a different user interface property module, a different logic property module, and a different event module.

* * * * *